(12) United States Patent
Gresset et al.

(10) Patent No.: US 9,974,033 B2
(45) Date of Patent: May 15, 2018

(54) METHOD FOR SETTING, IN A WIRELESS CELLULAR TELECOMMUNICATION NETWORK, THE POWER OF UPLINK RADIO SIGNALS

(75) Inventors: Nicolas Gresset, Rennes (FR); Mourad Khanfouci, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 14/004,611

(22) PCT Filed: Mar. 12, 2012

(86) PCT No.: PCT/EP2012/054243
§ 371 (c)(1),
(2), (4) Date: Oct. 23, 2013

(87) PCT Pub. No.: WO2012/123396
PCT Pub. Date: Sep. 20, 2012

(65) Prior Publication Data
US 2014/0057633 A1  Feb. 27, 2014

(30) Foreign Application Priority Data

Mar. 17, 2011 (EP) ................................. 11158731

(51) Int. Cl.
*H04W 52/48* (2009.01)
*H04W 52/14* (2009.01)
(Continued)

(52) U.S. Cl.
CPC ......... *H04W 52/48* (2013.01); *H04W 52/146* (2013.01); *H04W 52/241* (2013.01);
(Continued)

(58) Field of Classification Search
CPC .......... H04M 7/06; H04Q 2213/13096; H04Q 2213/13176; H04Q 2213/1322; H04W 36/00; H04W 60/00
(Continued)

(56) References Cited

U.S. PATENT DOCUMENTS

2008/0188260 A1 *  8/2008  Xiao et al. .................... 455/522
2010/0137016 A1    6/2010  Voyer
(Continued)

FOREIGN PATENT DOCUMENTS

EP       1 986 341       10/2008
WO    2010 036188        4/2010

OTHER PUBLICATIONS

International Search Report dated May 23, 2012 in PCT/EP12/54243 Filed Mar. 12, 2012.

*Primary Examiner* — Lester Kincaid
*Assistant Examiner* — Gary Lafontant
(74) *Attorney, Agent, or Firm* — Oblon, McClelland, Maier & Neustadt, L.L.P.

(57) ABSTRACT

A method for setting, in a wireless cellular telecommunication network, a power of radio signals transferred by mobile terminals served by plural nodes, the method including, executed by a server in charge of the nodes: checking if a message is received from one of the nodes, the message being representative of occurrence of an event in a cell of the node which transferred the message; adjusting a common parameter value for the nodes according to reception or not of the message; and transferring to each node the adjusted common parameter value or information derived from the adjusted common parameter value.

13 Claims, 7 Drawing Sheets

(51) Int. Cl.
    *H04W 52/24*     (2009.01)
    *H04W 52/26*     (2009.01)
    *H04W 52/28*     (2009.01)
    *H04W 52/40*     (2009.01)
    *H04W 52/50*     (2009.01)

(52) U.S. Cl.
    CPC ....... *H04W 52/242* (2013.01); *H04W 52/267* (2013.01); *H04W 52/283* (2013.01); *H04W 52/40* (2013.01); *H04W 52/50* (2013.01)

(58) Field of Classification Search
    USPC ........................................................ 455/436
    See application file for complete search history.

(56) References Cited

U.S. PATENT DOCUMENTS

2010/0195619 A1    8/2010    Bonneville et al.
2011/0237244 A1    9/2011    Hiltunen et al.

\* cited by examiner

METHOD FOR SETTING, IN A WIRELESS CELLULAR TELECOMMUNICATION NETWORK, THE POWER OF UPLINK RADIO SIGNALS

The present invention relates generally to a method and a device for setting the power of the signals transferred by mobile terminals served by the node.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e. too many system resources for a mobile terminal located in a building, if the signals radiated by the base stations and/or by the mobile terminal are too attenuated.

Solutions are proposed today. Particular base stations which are not necessarily deployed by the operator and thus not following a given planning, like femto base stations or pico base stations or relays named hereinafter home base stations, are largely deployed and may provide coverage areas within the buildings and base station offload. Relays may also provide outdoor coverage extension.

Base stations and home base stations are nodes of the wireless cellular telecommunication network.

The home base stations may enable a limited number of mobile terminals to access the wireless cellular telecommunication network through their respective resources. The mobile terminals allowed to access the resources of the network through a home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and his family can access the wireless cellular telecommunication network through the home base station. These mobile terminals are associated with the home base station.

Such massive deployment of home base stations increases the interference generated by mobile terminals served by home base stations or base stations on uplink signals transferred by mobile terminals served by neighbouring base stations or home base stations.

The patent application US 2010/0195619 discloses a method and device for adjusting the transmission power of signals.

The patent application US 2008/188260 discloses a method and device for uplink power control in a communication system.

The present invention aims at reducing the interference generated by mobile terminals served by home base stations or base stations on uplink signals transferred by mobile terminals served by neighbouring base stations or home base stations while guaranteeing a minimal quality of service to mobile terminals.

The present invention concerns a method for setting, in a wireless cellular telecommunication network, the power of the radio signals transferred by mobile terminals served by plural nodes, characterised in that the method comprises the steps executed by a server which is in charge of the nodes of:

checking if a message is received from one of the nodes, the message being representative of the occurrence of an event in the cell of the node which transferred the message, adjusting a common parameter value for the nodes according to the reception or not of the message, transferring to each node the adjusted common parameter value or information derived from the adjusted common parameter value.

The present invention concerns also a device for setting, in a wireless cellular telecommunication network, the power of the radio signals transferred by mobile terminals served by plural nodes, characterised in that the device is included in a server which is in charge of the nodes and comprises:

means for checking if a message is received from one of the nodes, the message being representative of the occurrence of an event in the cell of the node which transferred the message, means for adjusting a common parameter value for the nodes according to the reception or not of the message, means for transferring to each node the adjusted common parameter value or information derived from the adjusted common parameter value.

Thus, the transmit power of the mobile terminals is set according to the interference they generate and suffer to and from mobile terminals of neighboring nodes, which improves the overall system performance.

According to a particular feature, an event is a hand over of a mobile terminal served by the node which sends the message or a modification of the uplink path gain between a mobile terminal and the node which sends the message or a modification of the signal to interference plus noise ratio of a mobile terminal served by the node which sends the message or a modification of the location of a mobile terminal served by the node which sends the message, or the switching ON or OFF of a mobile terminal served by the node which sends the message or a modification of the throughput needed of a mobile terminal served by the node which sends the message.

Thus, the server adapts the common parameter to the system configuration changes.

According to a particular feature, if the server transfers to each node the adjusted common parameter value, each node:

determines, at least from the common parameter value, a power correction of the radio signals transferred by one group of mobile terminals served by the node, transfers the power correction to the mobile terminals of the group of mobile terminals.

Thus, the power setting is optimized in a distributed fashion, coordinated by the server and adapted to the system configuration changes.

According to a particular feature, the group of mobile terminals comprises all the mobile terminals served by the node.

Thus, the amount of exchanges between nodes is reduced.

According to a particular feature, at least one node forms plural groups of mobile terminals and the node:

determines, at least from the common parameter value and for each group of mobile terminals, a power correction of the radio signals transferred by one group of mobile terminals of the group of mobile terminals, transfers, to each mobile terminal of each group of mobile terminals, the power correction determined for the group of mobile terminals the mobile terminal belongs to.

Thus, the power setting is adapted to each group of mobile terminals and shows better performance.

According to a particular feature, each node:
determines another cell specific parameter which is dependent of cell specific parameters received from the other nodes,
transfers the other cell specific parameter to the other nodes.

Thus, the exchanged parameter can be broadcasted which does not require a specific node-to-node communication link.

According to a particular feature, each node:
receives another parameter from each other node, the other parameter being determined by the other node for the node,
transfers to other nodes another parameter, the other parameter being determined by the node for the other node.

Thus, the performance of the power setting is improved.

According to a particular feature, if the server transfers to each node information derived from the adjusted common parameter value, one information derived from the adjusted common parameter value determined for each node which is a power correction of the radio signals transferred by one group of mobile terminals served by the node to which the information is transferred.

Thus, the power setting is performed by the server, and the system performance is improved.

According to a particular feature, the server receives from each node a vector describing the lowest received power from the mobile terminals of the node Ndi and the highest interfering power from mobile terminals of the neighbouring nodes of said node and each power correction is determined according to the received vectors.

Thus, the number of parameters exchanged with the server is limited and the worst case performance for each node is improved.

According to still another aspect, the present invention concerns computer programs which can be directly loadable into a programmable device, comprising instructions or portions of code for implementing the steps of the method according to the invention, when said computer programs are executed on a programmable device.

The present invention also concerns an information storage means, storing a computer program comprising a set of instructions that can be run by a processor for implementing the aforementioned method in any one of its various embodiments, when the stored information is read by a computer and run by a processor.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 4:
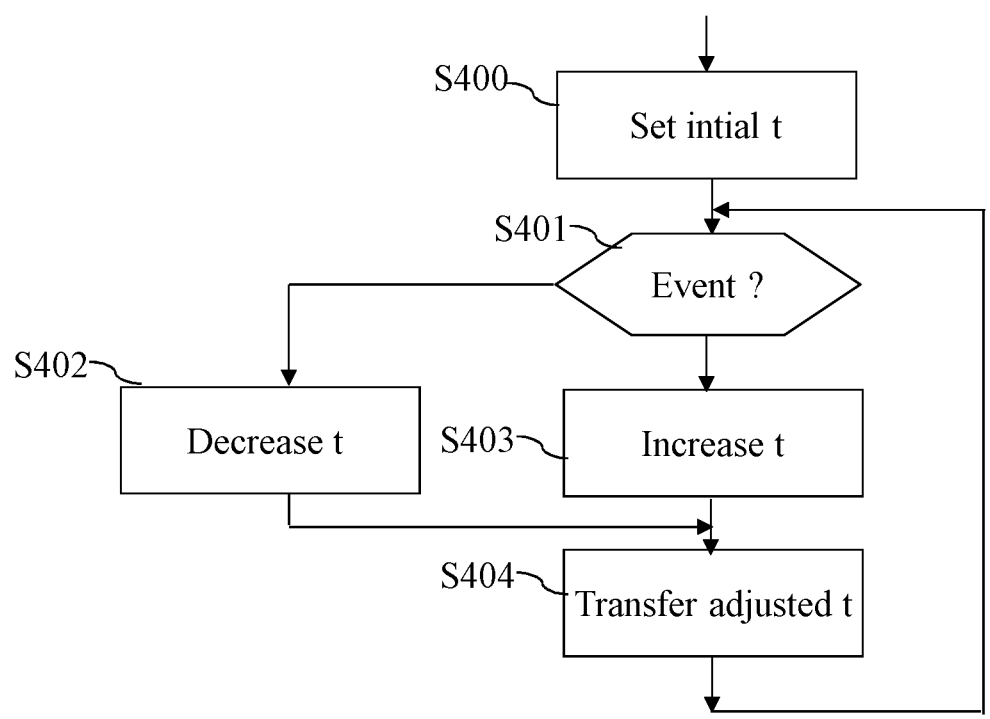
Figure 5A:
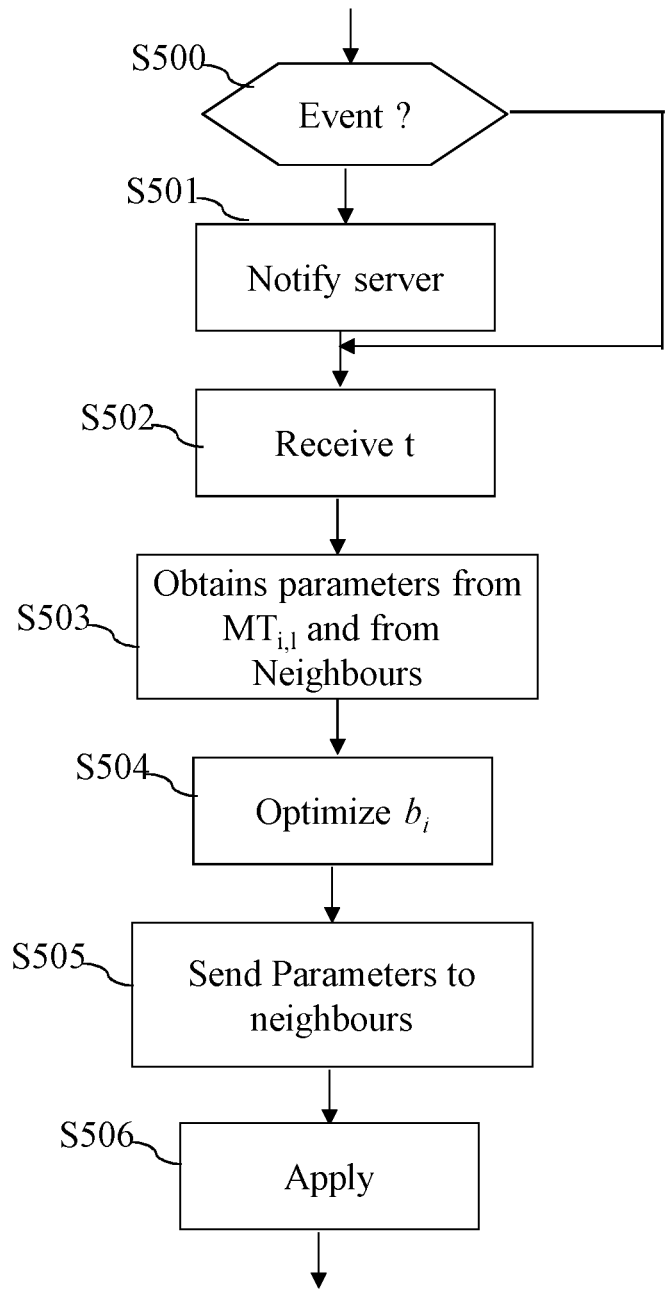
Figure 5B:
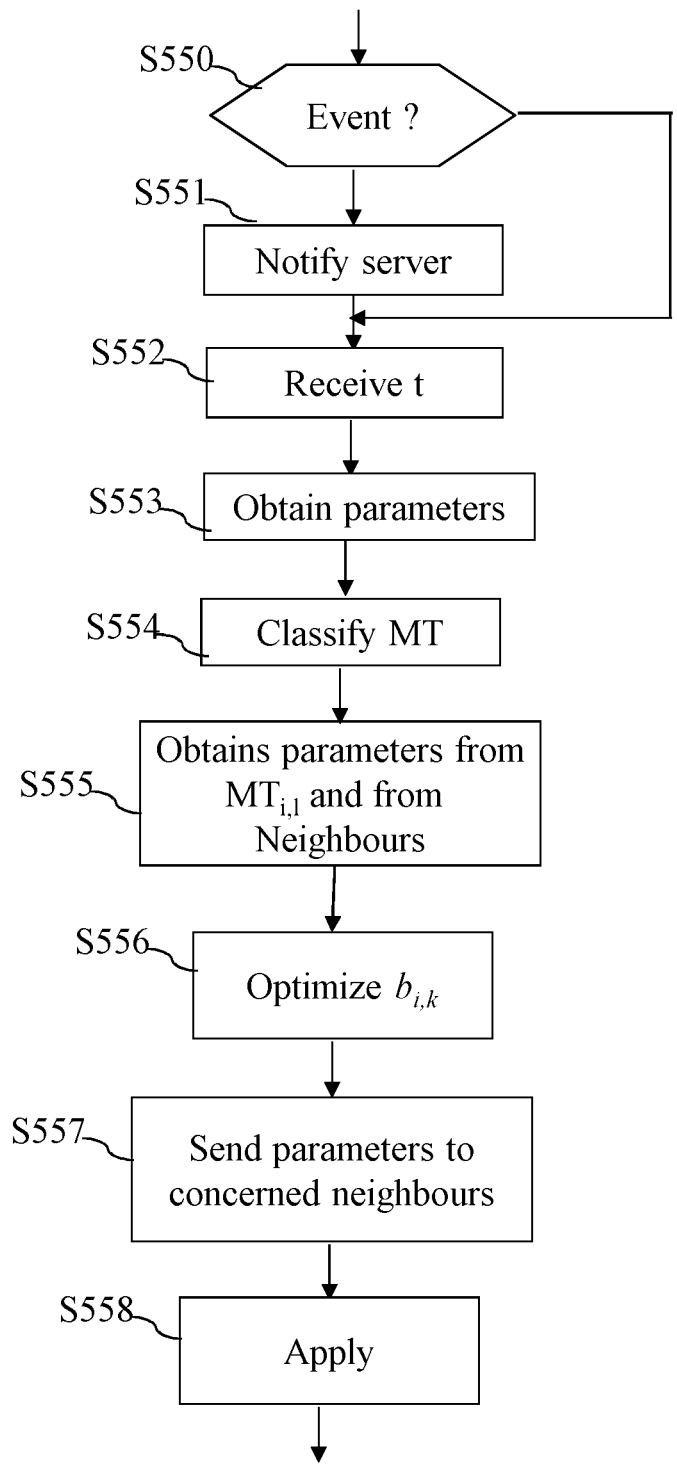
Figure 6:
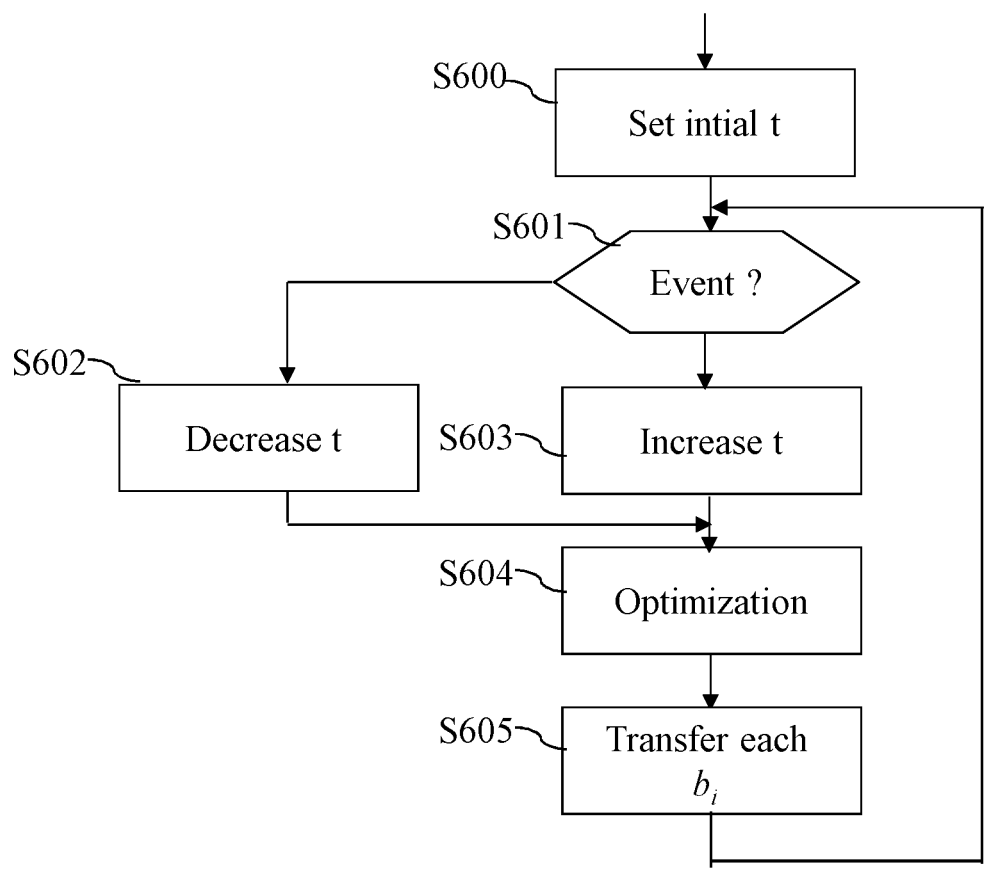
Figure 7:
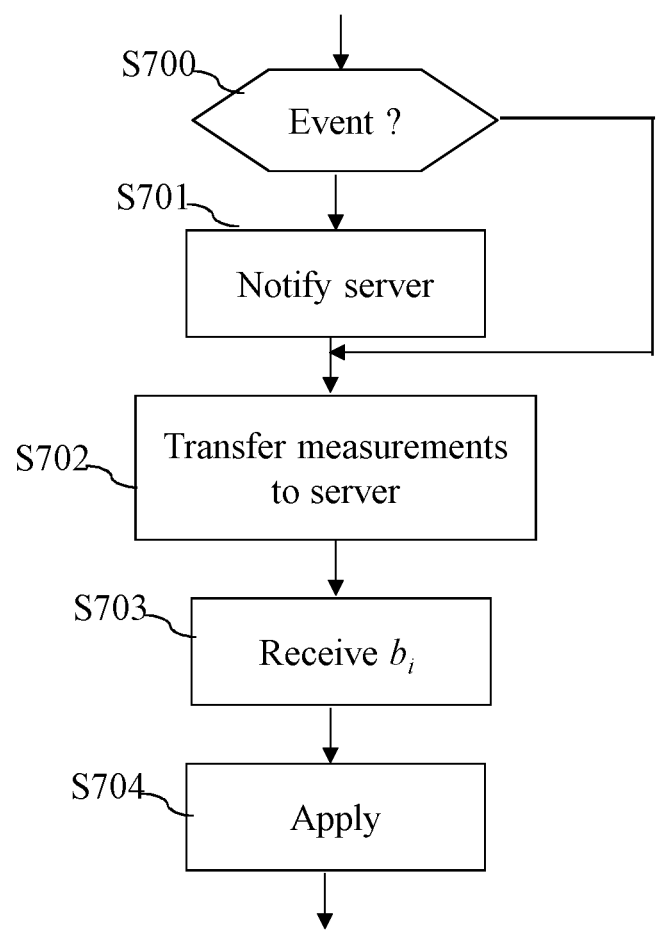

FIG. 4 discloses a first algorithm executed by the server for uplink signal transmit power adjustment according to a first mode of realization of the present invention;

FIG. 5a discloses a first algorithm executed by each node for uplink signal transmit power adjustment according to the first mode of realization of the present invention;

FIG. 5b discloses a second algorithm executed by each node for uplink signal transmit power adjustment according to a variant of the first mode of realization of the present invention;

FIG. 6 discloses a second algorithm executed by the server for uplink signal transmit power adjustment according to a second mode of realization of the present invention;

FIG. 7 discloses a third algorithm executed by each node for uplink signal transmit power adjustment according to the second mode of realization of the present invention.

Figure 1:
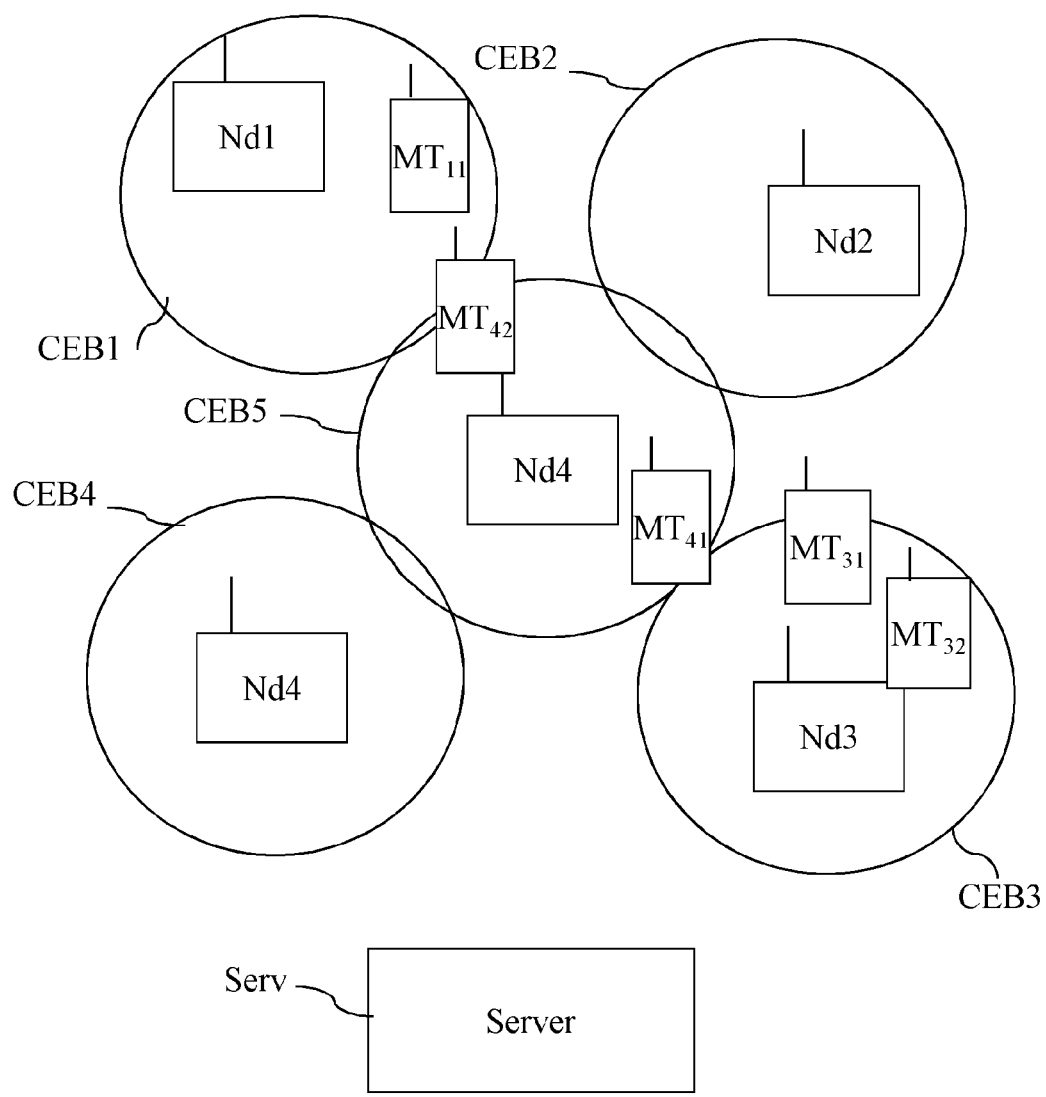
FIG. 1 represents a wireless cellular telecommunication network in which the present invention is implemented.

FIG. 1 represents a wireless cellular telecommunication network in which the present invention is implemented.

In FIG. 1, five nodes Nd1, Nd2, Nd3, Nd4 and Nd5 of a wireless cellular telecommunication network are shown.

Only five nodes Nd1 to Nd5 are shown but we can understand that the present invention works when a more or less important number of nodes Nd exist.

The nodes Nd are linked by a backbone network which may be, for example a DSL (Digital Subscriber Line) network or an ISDN (Integrated Services Digital Network).

The nodes Nd1 to Nd5 are nodes of the wireless cellular telecommunication network which serve mobile terminals MT located in their respective cells CEBH1 to CEHB5.

The node Nd1 serves the mobile terminal $MT_{11}$, the node Nd4 serves the mobile terminals $MT_{41}$ and $MT_{42}$ and the node Nd3 serves the mobile terminals $MT_{31}$ and $MT_{32}$.

Only five mobile terminals $MT_{11}$, $MT_{41}$, $MT_{42}$, $MT_{31}$ and $MT_{32}$ are shown in FIG. 1 for the sake of clarity but we can understand that the present invention works when a more or less important number of mobile terminals exist.

As already stated, the nodes Nd1 to Nd5 are named also base stations, femto base stations or pico base stations or relays.

For example, a relay is a node Nd which is connected to the wireless cellular telecommunication network via a wireless link with a base station, not shown in FIG. 1, of the wireless cellular telecommunication network.

Each node Nd1 to Nd5, when the node is a home base station, may be located into home and may enable mobile terminals MT associated to the concerned node Nd to access the wireless cellular telecommunication network.

For example, a node Nd, when the node is a home base station, and a mobile terminal MT are associated when the node Nd belongs to the owner of the mobile terminal MT or when the node Nd belongs to the family or friends of the owner of the mobile terminal MT.

When a mobile terminal MT is served by a node Nd, it can receive or establish or continue a communication with a remote telecommunication device through the node Nd.

The node Nd1 is able to receive signals transferred by the mobile terminal $MT_{11}$ which is located in the area or cell CEHB1. The node Nd1 transfers signals which can be received and processed by the mobile terminal $MT_{11}$ located in the cell CEHB1.

The node Nd3 is able to receive signals transferred by mobile terminals $MT_{31}$ and $MT_{32}$ which are located in the area or cell CEHB3. The node Nd3 transfers signals which can be received and processed by mobile terminals $MT_{31}$ and $MT_{32}$ located in the cell CEHB3.

The node Nd4 is able to receive signals transferred by mobile terminals $MT_{41}$ and $MT_{42}$ which are located in the area or cell CEHB4. The node Nd4 transfers signals which can be received and processed by mobile terminals $MT_{41}$ and $MT_{42}$ located in the cell CEHB4.

The mobile terminal $MT_{41}$ transfers signals which interfere much more on signals transferred by the mobile terminals $MT_{31}$ and $MT_{32}$ than the signals transferred by the mobile terminal $MT_{42}$ on signals transferred by the mobile terminals $MT_{31}$ and $MT_{32}$.

The mobile terminal $MT_{42}$ transfers signals which interfere much more on signals transferred by the mobile terminal $MT_{11}$ than the signals transferred by the mobile terminal $MT_{41}$ on signals transferred by the mobile terminal $MT_{11}$.

In the example of FIG. 1, each node Nd1 to Nd5 has only one cell CEHB1 to CEHB5. The present invention is also applicable when at least one node Nd has plural cells.

The server Serv manages the radio transmission power of the mobile terminals MT served by the nodes Nd1 to Nd5 which the server Serv is in charge of.

According to the invention, the server Serv:

checks if a message is received from one of the nodes, the message being representative of the occurrence of an event in the cell of the node which transferred the message, adjusts a common parameter value for the nodes according to the reception or not of the message, transfers to each node the adjusted common parameter value or information derived from the adjusted common parameter value.

Figure 2:
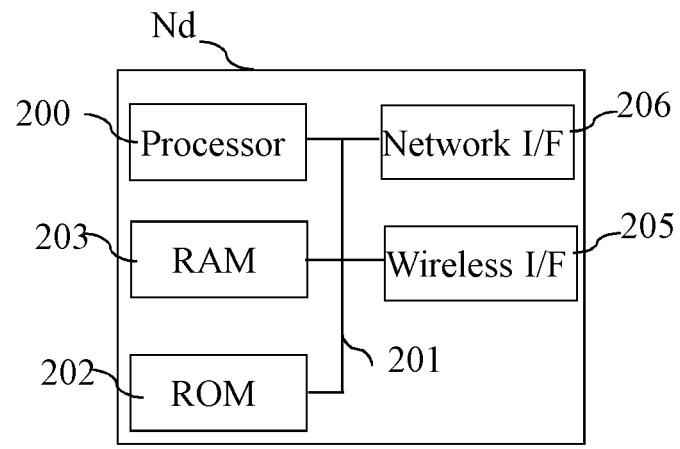
FIG. 2 is a diagram representing the architecture of a node in which the present invention is implemented.

FIG. 2 is a diagram representing the architecture of a node in which the present invention is implemented.

The node Nd has, for example, an architecture based on components connected together by a bus 201 and a processor 200 controlled by the programs as disclosed in FIGS. 5a, 5b and 7.

The bus 201 links the processor 200 to a read only memory ROM 202, a random access memory RAM 203, a wireless interface 205. The bus 201 may link the processor 200 to a network interface 206.

The memory 203 contains registers intended to receive variables and the instructions of the program related to the algorithms as disclosed in FIGS. 5a, 5b and 7 together with a table linking neighbouring node identifiers and parameter values received from said neighbouring nodes.

The processor 200 controls the operation of the network interface 206 and may control the operation of the wireless interface 205.

The read only memory 202 contains instructions of the programs related to the algorithms as disclosed in FIGS. 5a, 5b and 7, which are transferred, when the node Nd is powered on, to the random access memory 203.

The node Nd may be connected to a backbone network through the network interface 206. For example, the network interface 206 is a DSL modem, or an ISDN interface, etc. Through the network interface 206, the node Nd may transfer messages to the core network of the wireless cellular telecommunication network or transfers or receives parameter values to neighbouring nodes Nd.

The wireless interface 205 comprises means for receiving uplink signals according to the transmission power set according to the present invention.

The wireless interface 205 may comprise means for transferring parameters values according to the present invention.

The function of the network interface 206 may be executed by the wireless interface 205, for example when the node Nd acts as a relay.

The wireless interface 205 and the network interface 206 are the resources of the node Nd used by a mobile terminal MT in order to access to the wireless cellular telecommunication network when the mobile terminal MT establishes or receives a communication with a remote telecommunication device.

Figure 3:
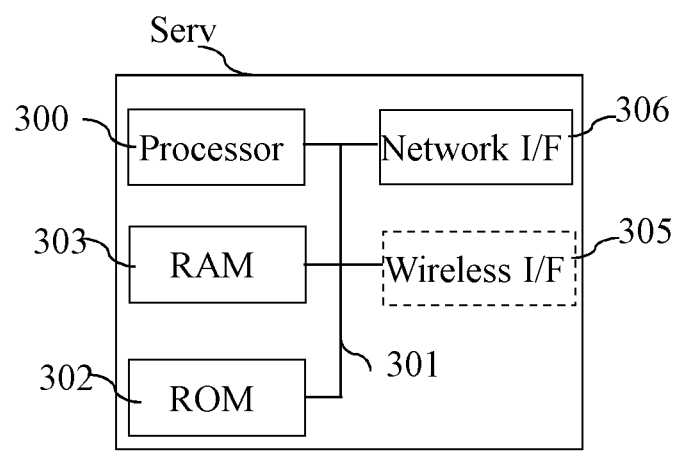
FIG. 3 is a diagram representing the architecture of a server in which the present invention is implemented.

FIG. 3 is a diagram representing the architecture of a server in which the present invention is implemented.

The server Serv has, for example, an architecture based on components connected together by a bus 301 and a processor 300 controlled by the programs as disclosed in FIGS. 4 and 6.

The bus 301 links the processor 300 to a read only memory ROM 302, a random access memory RAM 303 and a network interface 306.

The memory 303 contains registers intended to receive variables and the instructions of the programs related to the algorithms as disclosed in FIGS. 4 and 6.

The processor 300 controls the operation of the network interface 306.

The read only memory 302 contains instructions of the programs related to the algorithms as disclosed in FIGS. 4 and 6, which are transferred, when the server Serv is powered on, to the random access memory 403.

The server Serv is connected to the telecommunication network through the network interface 306. For example, the network interface 306 is a DSL (Digital Subscriber Line) modem, or an ISDN (Integrated Services Digital Network) interface, etc. Through the network interface 306, the server Serv may transfer messages to the core network and/or nodes of the wireless cellular telecommunication network.

The server Serv may be included in a base station. In that case, the bus 301 links also a wireless interface 305.

Any and all steps of the algorithms described hereinafter with regard to FIGS. 5 to 7 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 4 discloses a first algorithm executed by the server for uplink signal transmit power adjustment according to a first mode of realization of the present invention.

More precisely, the present algorithm is executed by the processor 300 of the server Serv.

At step S400, the processor 300 reads into the ROM memory an initial common parameter t value to be used for determining the transmission power of signals transferred by mobile terminals served by the nodes which the server Serv is in charge of.

For example the initial common parameter t value is set to a low value, for example at less than twenty of the maximal value the common parameter t can take.

At next step S401, the processor 300 checks if a message representative of an event is received from one node Nd, which the server Serv is in charge of.

An event is for example a change of the status of one mobile terminal served by a node which the server Serv is in charge of, or a change of the most interfering power $\beta_{j,u,i}$ as described hereinafter.

The status may be a hand over of a mobile terminal MT or a modification of the uplink path gain between a mobile terminal MT and its serving node or a modification of the signal to interference plus noise ratio of a mobile terminal MT or a modification of the location of a mobile terminal MT, or the switching ON or OFF of a mobile terminal MT or a modification of the throughput needed of a mobile terminal MT.

If a message representative of an event is received, the processor 300 moves to step S402. Otherwise, the processor 300 moves to step S403.

At step S402, the processor 300 sets the common parameter t value to a predetermined value. For example the common parameter t value is set to a low value, for example at less than twenty percent of the maximal value the common parameter t value can take or to null value or to the initial value of the common parameter t.

After that, the processor 300 moves to step S404.

At step S403, the processor 300 increases the common parameter t value, for example by ten percent of the previous common parameter t value.

At next step S404, the processor 300 commands the transfer, to each node Nd which the server Serv is in charge of, of the adjusted common parameter t value to be used for determining the transmission power of signals transferred by mobile terminals MT served by the nodes Nd.

FIG. 5a discloses a first algorithm executed by each node for uplink signal transmit power adjustment according to the first mode of realization of the present invention.

More precisely, the present algorithm is executed by the processor 200 of each node Nd which the server Serv is in charge of.

At the beginning of the present algorithm, the processor 200 of each node Nd sets each mobile terminal $MT_{i,l}$ to a reference transmit power where i denotes the index of the node Ndi and l denotes the index of the mobile terminal $MT_{i,l}$ served by the node Ndi.

The node Ndi then receives a power $\beta_{j,l,i}$ from the l-th mobile terminal of the neighbouring node Ndj.

At step S500, the processor 200 checks if an event occurs for one mobile terminal $MT_{i,l}$ the node Ndi serves.

An event is for example a change of the status of one mobile terminal $MT_{i,l}$ the node Ndi serves.

The status may be a hand over of a mobile terminal $MT_{i,l}$ or a modification of the uplink path gain between a mobile terminal $MT_{i,l}$ and the node Ndi or a modification of the signal to interference plus noise ratio of a mobile terminal $MT_{i,l}$ or a modification of the location of a mobile terminal $MT_{i,l}$, or the switching ON or OFF of a mobile terminal $MT_{i,l}$ or a modification of the throughput need of a mobile terminal $MT_{i,l}$.

If an event occurs, the processor 200 moves to step S501. Otherwise, the processor 200 moves to step S502.

At step S501, the processor 200 commands the transfer of a message to the server Serv through the network interface 206. The message notifies the server Serv that an event occurs.

After that, the processor 200 moves to step S502.

At step S502, the processor 200 detects the reception, through the network interface 206 of the common parameter t value to be used for determining the transmission power of signals transferred by mobile terminals $MT_{i,l}$ served by the node Ndi.

At next step S503, the node Ndi obtains uplink and/or downlink parameters related to measurements of the mobile terminals MT of its cell or neighbouring cells.

Received parameters are for example uplink received powers $b_j\beta_{j,l,i}$ at the node Ndi from each mobile terminal $Mt_{j,l}$ served by a neighbouring node Ndj, where l denotes the index of the l-th mobile terminal $MT_{j,l}$ served by the node Ndj when a power correction $b_j$ is applied at node Ndj.

Received parameters are for example the power $\beta_{j,l,i}$ with no power correction. Equivalently, we denote $\alpha_{j,l,i}$ the path gain observed between the node Ndi and the mobile terminal $Mt_{j,l}$ served by a neighbouring node Ndj, and which is measured in downlink by the mobile terminal $Mt_{j,l}$ or in uplink by the node Ndi.

Furthermore, the processor 200 detects the reception, through the network interface 206 and/or through the wireless interface 205 of other parameters from at least a part of the nodes Nd of which the server Serv is in charge or obtains parameters related to uplink parameters for mobile terminals $MT_{i,l}$ the node Ndi serves.

For example, the processor 200 detects the reception of parameters from the neighbouring nodes Ndj of the node Ndi.

Received parameters are for example uplink received powers $b_j\beta_{j,l,i}$ or $\beta_{j,l,i}$, if the node Ndi is not able to make the measurements by itself. In that case, these parameters can be evaluated at neighbouring node Ndj from the path gain measured in the downlink from the node Ndi to the l-th mobile terminal $MT_{j,l}$ served by the node Ndj. The considered parameters can also be stored at the nodes, so as to apply the invention on a long term basis.

The parameter $b_j$ is a power correction applied to a subset of mobile terminals $MT_{j,l}$ served by the node Ndj. The subset of mobile terminals $MT_{j,l}$ is selected from the highest interfering mobile terminals $MT_{j,l}$, i.e. the ones with highest received power $\beta_{j,l,i}$ to the neighbouring nodes Ndi.

The processor 200 determines the power $b_j\beta_{j,u,i}$ which is the power received in uplink by the node Ndi from the u-th mobile terminal $MT_{j,u}$ served by the j-th node Ndj, which generates the most interference on the uplink at the node Ndi.

The processor 200 determines the power $b_i\beta_{i,v,i}$ received in uplink by the node Ndi from the v-th mobile terminal $MT_{i,v}$ served by the node Ndi, which is received with the lowest power on the uplink at the node Ndi.

According to a first example of realization of the first mode of realization of the present invention, the parameters received from the neighbouring node Ndj are the uplink power corrections $b_j$ and a cell specific parameter $\hat{\lambda}_{jD}$ which will be disclosed herein after.

According to a second example of realisation of the first mode of realization of the present invention, the parameter received from the neighbouring node Ndj are the uplink power corrections $b_j$ and parameters $\varphi_{jiD}(x_i)$ determined by each neighbouring node Ndj for the node Ndi which will be disclosed herein after. Parameters $\varphi_{jiD}(x_i)$ are more precisely parameter functions.

It has to be noted here that when $\beta_{j,u,i}$ is provided to the node Ndi by the node Ndj, the $\beta_{j,u,i}$ reception occurs far less frequently than the $\hat{\lambda}_{jD}$ and $b_j$ exchange.

At next step S504, the processor 200 optimises the transmission power of signals transferred by the mobile terminals $MT_{i,l}$ the node Ndi serves.

The transmission power of signals transferred by the mobile terminals $MT_{i,l}$ the node Ndi serves is modified by computing a new uplink correction parameter $b_i$.

According to a first example of realization of the first mode of realization, the uplink power correction $b_i$ is for example determined by computing the optimization of the $G_{iD}$ based on its neighbouring nodes, i.e.

$$G_{iD} = \sum_{k \in \Omega_i} b_k + b_i$$

The minimization is done under a constraint of coverage in uplink, expressed by a minimal tolerated value $\gamma_i$ of the worst uplink SINR experienced by the mobile terminal $MT_{i,v}$, served by the node Ndi, i.e., $$\frac{\beta_{i,v,i} b_i}{\sum_{j \in \Omega_i} b_j \beta_{j,u,i} + N_0} \geq \gamma_i$$

For the uplink channels, in order to process the optimization, the present invention uses preferably the log barrier method as follows. The node Ndi computes the parameter $\lambda_{iD}$ as a function of the received parameters $\hat{\lambda}_{jD}$ and the common parameter t previously received.

$$\lambda_{iD} = t + \sum_{j \in \Omega_i} \frac{\gamma_j \beta_{i,u,j}}{\beta_{j,v,j}} \lambda_{jD} = t + \sum_{j \in \Omega_i} \beta_{i,u,j} \hat{\lambda}_{jD}$$

and $$\hat{\lambda}_{jD} = \frac{\gamma_j}{\beta_{j,v,j}} \lambda_{jD}$$

Then, the node Ndi computes its updated power correction as a function of the obtained power uplink power corrections $b_j$ and $\beta_{j,u,i}$:

$$b_i = \frac{1}{\lambda_{iD}} + \frac{\gamma_i}{\beta_{i,v,i}} \left( \sum_{j \in \Omega_i} b_j \beta_{j,u,i} + N_0 \right)$$

where $\gamma_i$ is the minimal signal interference plus noise ratio (SINR) threshold that can be tolerated in the cell of the node Ndi for the uplink, $N_0$ is the noise level measured by the node Ndi.

According to a second example of realization of the first mode of realization, the uplink power correction $b_i$ is performed according to $h_{iD}(x_i, x_{\Omega_i(1)}, \ldots, x_{\Omega_i(n_i)})$ which is the multivariate probability function that a mobile terminal $MT_{i,l}$ served by the node Ndi experiences a SINR lower than the threshold $\gamma_i$, i.e. one optimizes the nodes Nd transmit power under the constraint:

$$h_{iD}(x_i, x_{\Omega_i(1)}, \ldots, x_{\Omega_i(n_i)}) = P\left( \frac{\beta_{i,1,i} x_i}{\sum_{j \in \Omega_i} x_j \beta_{j,1,i} + N_0} \geq \gamma_i \right) \geq Q_i$$

where the probability function $h_{iD}(x_i, x_{\Omega_i(1)}, \ldots, x_{\Omega_i(n_i)})$ is defined according to instantaneous measurements $\hat{\beta}_{j,l,i}$ obtained in the uplink by the node Ndi or provided by the node Ndj of the mobile terminals $MT_{j,l}$ or on stored previous values, and where $Q_i$ is the target quality of service.

The processor 200 of node Ndi obtains from the node Ndj the function $$\varphi_{jiD}(x_i) = \frac{\partial \theta_{jiD}(x_i)}{\partial x_i} \times \frac{1}{\theta_{jiD}(x_i) - Q_i}$$

where $\theta_{jiD}(x_i) = h_{jD}(b_j, b_{\Omega_j(1)}, \ldots, x_i, \ldots, b_{\Omega_j(n_j)})$ is equal to the function $h_{iD}(x_i, x_{\Omega_i(1)}, \ldots, x_{\Omega_i(n_i)})$ when all entries are fixed to the obtained values $b_{\Omega_j(k)}$ except for the considered neighbouring node Ndi.

The node processor 200 of the node Ndi updates its power correction according to the obtained $\varphi_{jiD}(x_i)$ functions, by finding the uplink power correction $b_i$ which is the solution of $$\sum_{j \in \Omega_i} \varphi_{jiD}(b_i) + \varphi_{iiD}(b_i) = t.$$

The functions $\varphi_{ijD}(x_j)$ can be obtained by numerical computation, as well as the updated uplink power correction $b_i$ value. The functions $\varphi_{jiD}(x_i)$ may also be quantized before the transfer to neighbouring nodes Ndj.

In a variant, the above mentioned parameters are stored and the power correction computation is done based on the stored parameters in order to consider long term criterion.

At next step S505, the processor 200 commands the transfer, to the neighbouring nodes Ndj, of the computed parameters.

According to the first example of the first mode of realization, the processor 200 commands the transfer, to the neighbouring nodes Ndj, of the computed parameters $b_i$ and $\hat{\lambda}_{iD}$.

According to the second example of the first mode of realization, the processor 200 commands the transfer, to the neighbouring nodes Ndj, of $b_i$ and $\varphi_{ijD}(x_j)$.

At next step S506, the processor 200 commands the transfer to each mobile terminal MT served by the node Ndi of the updated uplink power correction $b_i$ value to be used by mobile terminals for transferring radio signals.

After that, the processor 200 returns to step S500.

FIG. 5b discloses a second algorithm executed by each node for uplink signal transmit power adjustment according to a variant of the first mode of realization of the present invention.

More precisely, the present algorithm is executed by the processor 200 of each node Nd which the server Serv is in charge of.

At the beginning of the present algorithm, the processor 200 of each node Nd sets each mobile terminal $MT_{i,l}$ to a reference transmit power where i denotes the index of the node Ndi and l denotes the index of the mobile terminal $MT_{i,l}$ served by the node Ndi. The node Ndi then receives a power $\beta_{j,l,i}$ from the l-th mobile terminal of the neighbouring node Ndj.

At step S550, the processor 200 checks if an event occurs for one mobile terminal $MT_{i,l}$ the node Ndi serves.

An event is for example a change of the status of one mobile terminal $MT_{i,l}$ the node Ndi serves.

The status is as disclosed at step S500 of the algorithm of FIG. 5a.

If an event occurs, the processor 200 moves to step S551. Otherwise, the processor 200 moves to step S552.

At step S551, the processor 200 commands the transfer of a message to the server Serv through the network interface 206. The message notifies the server Serv that an event occurs.

After that, the processor 200 moves to step S552.

At step S552, the processor 200 detects the reception, through the network interface 206, of the common parameter t value to be used for determining the transmission power of signals transferred by mobile terminals $MT_{i,l}$ served by the node Ndi.

At next step S553, the processor 200 identifies, for each mobile terminal $MT_{i,l}$ the node Ndi serves, the downlink power of signals received by the mobile terminals $MT_{i,l}$ from neighbouring nodes Ndj.

The downlink power of signals received by the mobile terminals $MT_{i,l}$ from neighbouring nodes Ndj is representative of the proximity of the mobile terminals from one neighbouring node Ndj and therefore of the level of interference that mobile terminals $MT_{i,l}$ served by the node Ndi generate on the signals received by neighbouring nodes Ndj and/or of the level of interference that mobile terminals $MT_{j,l}$ served by the neighbouring node Ndj generate on the signals received by the node Ndi.

At next step S554, the processor 200 classifies the mobile terminals $MT_{i,l}$ the node Ndi serves into groups of mobile terminals. Each group of mobile terminals comprises the mobile terminals which are the most interfering mobile terminals for a given neighbouring node Ndj.

For example, for each neighbouring node Ndj, the processor 200 forms a group of mobile terminals $MT_{i,l}$ which receive downlink signals at the highest power from the neighbouring node Ndj among the neighbouring nodes or forms a group of mobile terminals $MT_{i,l}$ which receive downlink signals at a power level which is upper than a given threshold.

In another variant of the embodiment, the node Ndj identifies the set of high interfering MTs from the node i and provides the selected subset to the node Ndj.

It has to be noted that the processor 200 may form groups of mobile terminals, each group of mobile terminals comprises the mobile terminals which are the most interfering mobile terminals for plural neighbouring nodes Nd.

At next step S555, the processor 200 obtains parameters and the uplink received powers $b_{j,k}\beta_{i,l,i,k}$ at the node Ndi from each mobile terminal $MT_{j,l,k}$ served by a neighbouring node Ndj which belongs to the k-th group of mobile terminals $MT_{j,l}$ of the node Ndj which interference on the node Ndi is high, where l denotes the index of the l-th mobile terminal served by the node Ndj when a power correction $b_{j,k}$ is applied at node Ndj for the mobile terminals $MT_{i,l}$ of the k-th group of mobile terminals.

The processor 200 determines the power $b_{j,k}\beta_{j,u,i,k}$ which is the power received in uplink by the node Ndi from the u-th mobile terminal MTj,u of the k-th group of mobile terminals served by the j-th node Ndj, which generates the most interference on the uplink at the node Ndi.

The processor 200 determines the power $b_{i,k}\beta_{i,v,i,k}$ received in uplink by the node Ndi from the v-th mobile terminal $MT_{i,v}$ served by the node Ndi, which is received with the lowest power on the uplink at the node Ndi.

According to a first example of realization of the second mode of realization of the present invention, the parameters received from the neighbouring node Ndj are uplink power corrections $b_{j,k}$ and cell specific parameters $\hat{\lambda}_{j,kD}$ will be disclosed herein after.

According to a second example of realization of the first mode of realization of the present invention, the parameters received from the neighbouring node Ndj are uplink power corrections $b_{j,k}$ and parameters $\varphi_{jikD}(x_i)$ determined by each neighbouring node Ndj for the node Ndi $\varphi_{jikD}(x_i)$ which will be disclosed herein after.

It has to be noted here that when $\beta_{j,u,i,k}$ is provided to the node Ndi by the node Ndj, the $\beta_{j,u,i,k}$ reception occurs far less frequently than the $\hat{\lambda}_{j,kD}$ and $b_{j,k}$ exchange.

At next step S556, the processor 200 optimises the transmission power of signals transferred by the mobile terminals $MT_{i,l}$ the node Ndi serves.

For each group of mobile terminals formed at step S556, the processor 200 computes a new uplink correction parameter $b_{i,k}$.

For example, the uplink power correction $b_{i,k}$ is for example determined by computing the optimization of the $G_{i,kD}$ based on its neighbouring nodes, i.e.

$$G_{i,kD} = \sum_{m \in \Omega_i} b_{m,k} + b_{i,k}$$

The minimization is done under a constraint of coverage in uplink, expressed by a minimal tolerated value $\gamma_{i,k}$ of the worst uplink SINR experienced by the mobile terminal $MT_{i,v}$ of the k-th group of mobile terminals served by the node Ndi, i.e.

$$\frac{\beta_{i,v,i,k} b_{i,k}}{\sum_{j \in \Omega_i} b_{j,k}\beta_{j,u,i,k} + N_0} \geq \gamma_{i,k}$$

For the uplink channels, in order to process the optimization, the present invention uses preferably the log barrier method as follows. The node Ndi computes the parameter $\lambda_{i,kD}$ as a function of the received parameters $\hat{\lambda}_{j,kD}$ and the common parameter t previously received.

$$\lambda_{i,kD} = t + \sum_{j \in \Omega_i} \frac{\gamma_{j,k}\beta_{i,u,j,k}}{\beta_{j,v,j,k}}\lambda_{j,kD} = t + \sum_{j \in \Omega_i} \beta_{i,u,j,k}\hat{\lambda}_{j,kD}$$

and $$\hat{\lambda}_{j,kD} = \frac{\gamma_{j,k}}{\beta_{j,v,j,k}}\lambda_{j,kD}$$

Then, the node Ndi computes, for each group of mobile terminals the node Ndi serves, its updated power correction as a function of the obtained power measurement $b_{jk}$ and $\beta_{j,u,i,k}$:

$$b_{i,k} = \frac{1}{\lambda_{1,kD}} + \frac{\gamma_{i,k}}{\beta_{i,v,i,k}}\left(\sum_{j \in \Omega_i} b_{j,k}\beta_{j,u,i,k} + N_0\right)$$

where $\gamma_{i,k}$ is the minimal signal interference plus noise ratio (SINR) threshold that can be tolerated for the k-th group of mobile terminals of the node Ndi for the uplink, $N_0$ is the noise level measured by the node Ndi.

It has to be noted here that the computation of each uplink power correction $b_{j,k}$ applied to the mobile terminals MT of the k-th group of mobile terminals served by the node Ndj may be executed using the second example of computation disclosed at step S504 of FIG. 5a.

At next step S557, the processor 200 commands the transfer, to the neighbouring nodes Ndj, of the computed parameters.

The processor 200 commands the transfer, to the neighbouring nodes Ndj, of the computed parameters $b_{i,k}$ and $\hat{\lambda}_{i,kD}$ where k is the index of the group of mobile terminals served by the node Ndi which interfere the most the node Ndj.

At next step S558, the processor 200 commands the transfer to each mobile terminal MT of each group of mobile terminals served by the node Ndi of the corresponding updated uplink power correction $b_{i,k}$ value to be used by mobile terminals for transferring radio signals.

After that, the processor 200 returns to step S550.

FIG. 6 discloses a second algorithm executed by the server for uplink signal transmit power adjustment according to a second mode of realization of the present invention.

More precisely, the present algorithm is executed by the processor 300 of the server Serv.

At step S600, the processor 300 reads into the ROM memory an initial common parameter t value to be used for determining the transmission power of signals transferred by mobile terminals served by the nodes which the server Serv is in charge of.

For example the initial common parameter t value is set to a low value, for example at less than twenty of the maximal value the common parameter t can take.

At next step S601, the processor 300 checks if a message representative of an event is received from one node Nd, which the server Serv is in charge of.

An event is for example a change of the status of one mobile terminal served by a node which the server Serv is in charge of as disclosed at step S401 of FIG. 4.

If a message representative of an event is received, the processor 300 moves to step S602. Otherwise, the processor 300 moves to step S403.

At step S602, the processor 300 sets the common parameter t value to a predetermined value. For example the common parameter t value is set to a low value, for example at less than twenty percent of the maximal value the common parameter t value can take or to null value or to the initial value of the common parameter t.

After that, the processor 300 moves to step S604.

At step S603, the processor 300 increases the common parameter t value, for example by ten percent of the previous common parameter t value.

At next step S604, the processor 300 optimises the transmission power of signals transferred by the mobile terminals MT served by the nodes Nd which the server Serv is in charge of.

The processor 300 obtains, from each node Nd, the vector Ai which will be disclosed hereinafter.

The processor 300 optimises the transmission power of signals transferred by the mobile terminals MT served by the nodes Nd which the server Serv is in charge of by computing an uplink correction parameter $b_i$ for each node Ndi.

According to an example of realization, the power correction parameter $b_i$ for the node Ndi is for example determined by computing the optimization of the $G_C(\underline{b})$ function based on the uplink correction parameters of its neighbouring nodes Ndj.

$$G_C(\underline{b}) = \left(\sum_{m=1}^{N} b_m^p\right)^{1/p}$$

Where N is the number of nodes the Server Serv is in charge of, p is a predetermined parameter, and $\underline{b}$ is the vector of the uplink correction parameters, i.e. $\underline{b} = [b_1, b_2, \ldots, b_N]^T$.

For example, the processor 300 uses the generalized mean utility function with parameter p which minimizes the maximum transmit power among mobile terminals MT by choosing p sufficiently high, for example larger than four.

The minimization is done under a constraint of coverage in uplink, expressed by a minimal tolerated value $\gamma_i$ of the worst uplink SINR experienced by the mobile terminal $MT_{i,v}$, served by the node Ndi, i.e., $$\frac{\beta_{i,v,i} b_i}{\sum_{j \neq i} b_j \beta_{j,u,i} + N_0} \geq \gamma_i$$

For that, the processor 300 minimizes the function $J(\underline{x})$ $$J(\underline{x}) = G_C(\underline{x}) - \frac{1}{t}\sum_{i=1}^{N} \log\left(x_i - \frac{\gamma_i}{\beta_{i,v,i}}\left(\sum_{\substack{j=1 \\ j \neq i}}^{N} x_j \beta_{j,u,i} + N_0\right)\right) =$$

$$G_C(\underline{x}) - \frac{1}{t}\sum_{i=1}^{N} \log\left(A_i \underline{x} - \frac{\gamma_i}{\beta_{i,v,i}} N_0\right)$$

where $A_i$ is a vector describing the lowest receive power from the mobile terminals of the node Ndi and the highest interfering power from mobile terminals of the neighbouring nodes of the node Ndi, the elements $A_{i,j}$ of the vector $A_i$ are defined as $A_{i,i} = 1$ and $$A_{i,j} = -\frac{\gamma_i}{\beta_{i,v,i}} \beta_{i,u,j}$$

for $j \neq i$

The optimization is done by evaluating $$Grad(J(\underline{x})) = G_C(\underline{x})^{1-p} \underline{x}^{p-1} + \frac{1}{t}\sum_{i=1}^{N} \frac{A_i^T}{A_i \underline{x} - \frac{\gamma_i}{\beta_{i,v,i}} N_0}$$

where the notation $\underline{b}^{p-1}$ means element wise power of the vector $\underline{b}$, $(\bullet)^T$ is the matrix transpose notation, and where $Grad(J(\underline{x}))$ is the gradient vector of the function $J(\underline{x})$.

Then the processor 300 finds $\underline{b}$ which solves the system of equations:

$Grad(J(\underline{b})) = 0$

The solution of this system of equations can be done offline with different numerical techniques.

For example, projected gradient descent or Newton method can be used since the set of equations to be solved are non-linear in the powers.

According to another example of realization, the power correction parameter $b_i$ is for example computed according to a function $h_{iC}(\underline{x})$, where $\underline{x} = (x_1, \ldots, x_N)$, $h_{iC}(\underline{x})$ is a the multivariate probability function that a mobile terminal MT in communication with node Ndi experiences a SINR lower than the threshold $\gamma_i$, i.e. one optimizes the nodes Nd transmit power under the constraint:

$$h_{iC}(\underline{x}) = P\left(\frac{\beta_{i,1,i} x_i}{\sum_{\substack{j=1 \\ j \neq i}}^{N} x_j \beta_{j,1,i} + N_0} \geq \gamma_i\right) \geq Q_i$$

where the probability is defined according to instantaneous measurements $\beta_{j,l,i}$ of the mobile terminals $MT_{i,l}$ or on stored previous values and where $Q_i$ is the target quality of service.

The processor 300 minimizes J(t)

$$J(t) = G_C(\underline{x}) - \frac{1}{t}\sum_{i=1}^{N} \log(h_{iC}(\underline{x}) - Q_i)$$

The optimization is done by evaluating the function $$Grad(J(\underline{x})) = G_C(\underline{x})^{1-p}\underline{x}^{p-1} + \frac{1}{t}\sum_{i=1}^{N} \frac{Grad(h_{iC}(\underline{x}))}{h_{iC}(\underline{x}) - Q_i}$$

Where $Grad(h_{iC}(\underline{x}))$ is the Gradient vector of $h_{iC}(\underline{x})$.

Then the processor 300 finds $\underline{b}$ which satisfies: $Grad(J(\underline{b}))=0$ At next step S605, the processor 300 command the transfer of each computed power correction parameter $b_i$ to the corresponding node Ndi.

After that, the processor 300 returns to step S601.

It has to be noted here that the algorithm of FIG. 6 is disclosed in an example wherein no group of mobile terminals are formed.

The present algorithm is also applicable when the server Serv forms, for each node Nd, groups of mobile terminals.

FIG. 7 discloses a third algorithm executed by each node for uplink signal transmit power adjustment according to the second mode of realization of the present invention.

More precisely, the present algorithm is executed by the processor 200 of each node Nd which the server Serv is in charge of.

At the beginning of the present algorithm, the processor 200 of each node Nd sets each mobile terminal $MT_{i,l}$ to a reference transmit power where i denotes the index of the node Ndi and l denotes the index of the mobile terminal $MT_{i,l}$ served by the node Ndi. The node Ndi then receives a power $\beta_{j,l,i}$ from the l-th mobile terminal of the neighbouring node Ndj.

At step S700, the processor 200 checks if an event occurs for one mobile terminal MT the node Ndi serves.

An event is for example a change of the status of one mobile terminal $MT_{i,l}$ the node Ndi serves as disclosed at step S401 of FIG. 4, or a change of the most interfering power $\beta_{j,u,i}$.

If an event occurs, the processor 200 moves to step S701. Otherwise, the processor 200 moves to step S702.

At step S701, the processor 200 commands the transfer of a message to the server Serv through the network interface 206. The message notifies the server Serv that an event occurs.

After that, the processor 200 moves to step S702.

At step S702, the processor 200 commands the transfer of parameters to the server Serv which enable the server Serv to determine the function $h_{iC}(\underline{x})$ of node Ndi or determines the function $h_{iC}(\underline{x})$ of node Ndi and transfers it to the server Serv.

At next step S703, the processor 200 detects the reception of the computed power correction parameter $b_i$.

At next step S704, the processor 200 commands the transfer to each mobile terminal $MT_{i,l}$ served by the node Ndi of the updated uplink power correction $b_i$ value to be used by each mobile terminal $MT_{i,l}$ for transferring radio signals.

After that, the processor 200 returns to step S700.

Naturally, many modifications can be made to the embodiments of the invention described above without departing from the scope of the present invention.

The invention claimed is:

1. A method for causing a server to set a power of radio signals transferred by mobile terminals served by plural nodes in a wireless cellular telecommunication network, the server controlling the plural nodes, the method comprising:
    checking whether a message is received from one of the plural nodes, the message being representative of an occurrence of an event in a cell of the one of the plural nodes that transferred the message;
    setting a common parameter value that is common to the plural nodes to an initial value when the message is received from the one of the plural nodes;
    incrementing the common parameter value up to a maximum value when no message is received from the plural nodes; and
    transferring to each of the plural nodes a same adjusted common parameter value or information derived from the same adjusted common parameter value after at least one of incrementing or decrementing the common parameter value to generate the same adjusted common parameter value,
    wherein the plural nodes determine a respective power correction factor based on adding the common parameter to a weighted sum of cell specific parameters.

2. A method according to claim 1, wherein the event includes
    a hand over of a mobile terminal served by the one of the plural nodes that sends the message,
    a modification of an uplink path gain between a mobile terminal and the one of the plural nodes that sends the message,
    a modification of a signal to interference-plus-noise ratio of a mobile terminal served by the one of the plural nodes that sends the message,
    a modification of a location of a mobile terminal served by the one of the plural nodes that sends the message,
    switching ON or OFF of a mobile terminal served by the one of the plural nodes that sends the message, or
    a modification of a throughput needed of a mobile terminal served by the one of the plural nodes that sends the message.

3. A method according to claim 1, wherein the server transfers to each of the plural nodes the adjusted common parameter value after the incrementing or the decrementing, and the method further comprises:
    determining, by at least one of the plural nodes and at least from the adjusted common parameter value, the power correction factor, the power correction factor being used to correct the radio signals transferred by one group of mobile terminals served by the one of the plural nodes; and
    transferring, by at least one of the plural nodes, the power correction factor to the mobile terminals of the group of mobile terminals.

4. A method according to claim 3, wherein the group of mobile terminals comprises all mobile terminals served by the one of the plural nodes.

5. A method according to claim 3, further comprising:
    forming, by the at least one of the plural nodes, plural groups of mobile terminals;

determining, by the at least one of the plural nodes and at least from the common parameter value and for each group of mobile terminals, the power correction factor; and transferring, to each mobile terminal of each group of mobile terminals, the power correction factor determined for the group of mobile terminals to which the mobile terminal belongs.

6. A method according to claim 5, further comprising:
transferring, by each of the plural nodes to others of the plural nodes, the determined power correction factor or transferring to at least one node associated to one group of mobile terminals the power correction factor determined for the group of mobile terminals.

7. A method according to claim 6, further comprising:
determining, by each of the plural nodes, the cell specific parameter based on cell specific parameters received from the other nodes and the common parameter; and
transferring, by each of the plural nodes, the cell specific parameter to the other nodes.

8. A method according to claim 5, further comprising:
receiving, by each of the plural nodes, another parameter from each other node of the plural nodes, the other parameter being determined by each other node of the plural nodes for each of the plural nodes; and
transferring, by each of the plural nodes to each other node of the plural nodes another parameter, the other parameter being determined by each of the plural nodes for each other node of the plural nodes.

9. A method according to claim 1, wherein the server transfers to each of the plural nodes information derived from the adjusted common parameter value, one information derived from the adjusted common parameter value determined for each of the plural nodes which is a power correction of the radio signals transferred by one group of mobile terminals served by the one of the plural nodes to which the information is transferred.

10. A method according to claim 9, further comprising:
receiving, by the server, from each of the plural nodes a vector describing a lowest received power from the mobile terminals of one of the plural nodes and a highest interfering power from mobile terminals of nodes neighbouring the one of the plural nodes, and each power correction is determined according to the received vectors.

11. A device for setting, in a wireless cellular telecommunication network, a power of radio signals transferred by mobile terminals served by plural nodes, the device being included in a server which is in charge of the plural nodes, the device comprising:

a checking circuit configured to check whether a message is received from one of the plural nodes, the message being representative of an occurrence of an event in a cell of the one of the plural nodes that transferred the message;

an adjustment circuit configured to
set a common parameter value that is common to the plural nodes to an initial value when the message is received from the one of the plural nodes, and
increment the common parameter up to a maximum value when no message is received from the plural nodes; and a transfer circuit configured to transfer to each of the plural nodes a same adjusted common parameter value or information derived from the same adjusted common parameter value after at least one of incrementing or decrementing the same common parameter value to generate the adjusted common parameter value, wherein the plural nodes determine a respective power correction factor based on adding the common parameter to a weighted sum of cell specific parameters.

12. The method according to claim 1, wherein the initial value to which the common parameter is set to zero.

13. A communication system, comprising:
a device configured to set a power of radio signals transmitted by terminal devices in a wireless radio telecommunications network, the terminal devices being served by plural nodes, the device including:
a checking circuit configured to check whether a message is received from one of the plural nodes, the message being representative of an occurrence of an event in a cell of the one of the plural nodes that transferred the message,
an adjustment circuit configured to set a common parameter value that is common to the plural nodes to an initial value when the message is received from the one of the plural nodes, and increment the common parameter up to a maximum value when no message is received from the plural nodes, and
a transfer circuit configured to transfer to each of the plural nodes a same adjusted common parameter value or information derived from the same adjusted common parameter value after at least one of incrementing or decrementing the same common parameter value to generate the adjusted common parameter value; and
the plural nodes which are configured to determine a respective power correction factor based on adding the common parameter to a weighted sum of cell specific parameters.

* * * * *